United States Patent [19]

Chiavaroli

[11] 4,387,690
[45] Jun. 14, 1983

[54] FUEL EVAPORATION DEVICE

[75] Inventor: Donald J. Chiavaroli, Norton, Mass.

[73] Assignee: Texas Instruments Incorporated, Dallas, Tex.

[21] Appl. No.: 320,274

[22] Filed: Nov. 12, 1981

[51] Int. Cl.³ .......................................... F02M 31/00
[52] U.S. Cl. ................................. 123/549; 123/552; 123/547; 261/142
[58] Field of Search ............... 123/549, 546, 547, 552; 261/142; 219/205, 206, 207

[56] References Cited

U.S. PATENT DOCUMENTS

| | | | |
|---|---|---|---|
| 1,472,233 | 10/1923 | Taylor | 123/549 |
| 2,700,722 | 1/1955 | Gurley | 123/549 |
| 2,719,520 | 10/1955 | Balzer | 123/549 |
| 3,987,772 | 10/1976 | McBride, Jr. | |
| 4,107,515 | 8/1978 | Kulwicki | |
| 4,108,125 | 8/1978 | Marcoux et al. | |
| 4,141,327 | 2/1979 | Marcoux et al. | |
| 4,242,999 | 6/1981 | Hoser | |
| 4,303,050 | 12/1981 | Platzer | 261/142 |
| 4,308,845 | 1/1982 | Sarto | 261/142 |
| 4,313,413 | 2/1982 | Miyoshi | 123/552 |
| 4,359,974 | 11/1982 | Igashira | 123/549 |

Primary Examiner—Ronald H. Lazarus
Attorney, Agent, or Firm—James P. McAndrews; John A. Haug; Melvin Sharp

[57] ABSTRACT

A fuel evaporation device for enhancing fuel evaporation in an automotive fuel supply system without excessively interfering with the flow of an air-fuel mixture to an automotive engine is particularly adapted for use where the system has an air-fuel passage directing the air-fuel mixture into an intake manifold and where fuel tends to condense on the walls of the passage during engine start up on cold days. The device has a multi-ply gasket with a central opening to be mounted on the engine between the air-fuel induction passage and the manifold, has a first terminal with a ring-shaped part mounted between the plies of the gasket to extend around a major part of the gasket opening, has a second terminal mounted in a common plane between the plies to extend into the opening in the remaining part of the opening periphery, has a tube with a flange at one end extending around a corresponding major part of its periphery secured to the ring-shaped part of the first terminal so that the tube is adapted to intercept fuel condensed on the passage walls and extends into the manifold, has a self-regulating electrical resistance heater electrically connected to the opposite end of the tube to be disposed within the manifold spaced from the opposite tube end in the path of the air-fuel mixture being directed into the manifold to receive condensed fuel from the opposite tube end, and has a conductor electrically connected between the heater and the second terminal for connecting the heater in an energizing circuit.

8 Claims, 4 Drawing Figures

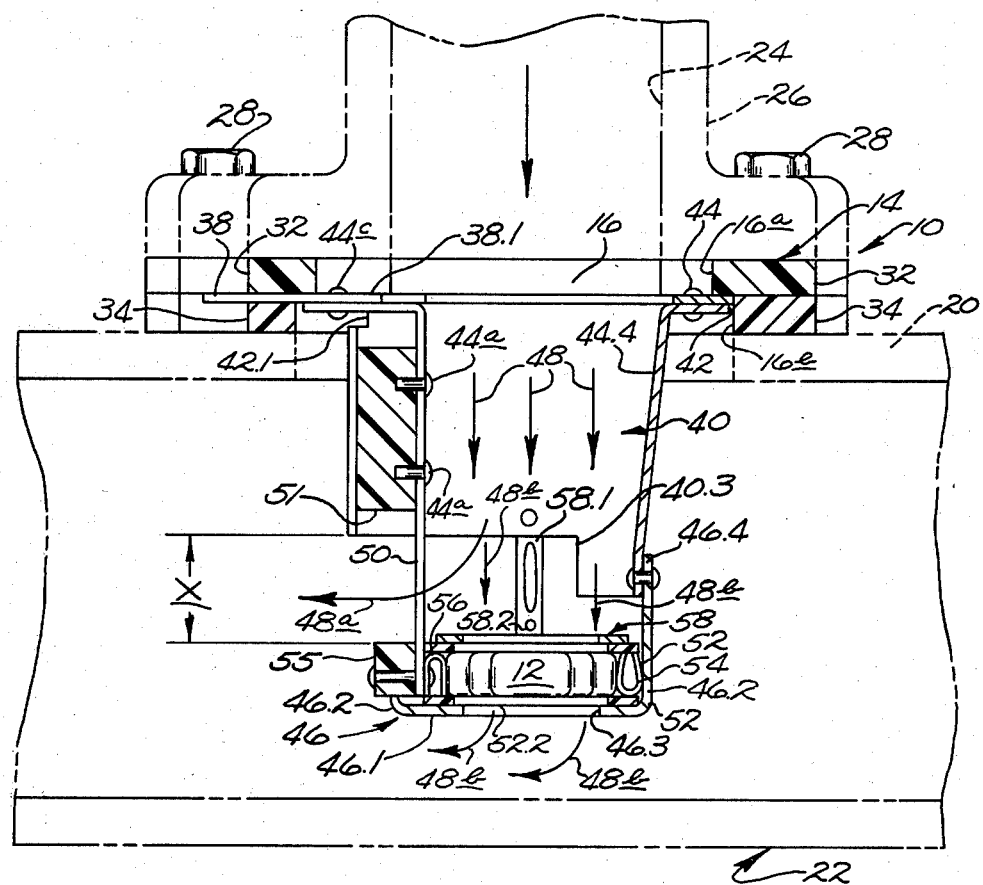
Fig. 3.
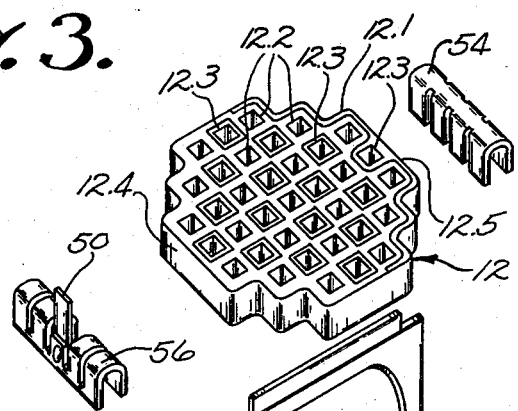
Fig. 4.
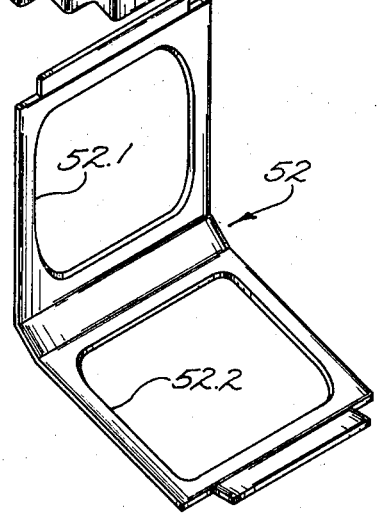

FUEL EVAPORATION DEVICE

BACKGROUND OF THE INVENTION

The field of this invention is that of fuel evaporation heaters and the invention relates more particularly to a fuel evaporation heater for use in an automotive fuel supply system for enhancing fuel evaporation without unduly interfering with the flow of an air-fuel mixture to an automotive engine.

It has become common practice to mount a self-regulating electrical resistance heater between the air-fuel induction passage of a carburetor or the like and the intake manifold of an engine for enhancing fuel evaporation in an air-fuel mixture being furnished to the engine, thereby to improve fuel use efficiency and engine driveability and to reduce the emission of exhaust gas pollutants. Typically for example such a self-regulating heater has comprised a multipassage body of a ceramic material of positive temperature coefficient of resistivity (PTC) which has been mounted in the air-fuel passage of a carburetor so that the air-fuel mixture being furnished to the engine is directed through the multiple passages of the ceramic body to be heated as the air-fuel mixture is fed to the engine. In those cases where such a positioning of the multipassage heater body has been found to unduly interfere with the flow of an air-fuel mixture to the engine, the heater has been disposed within the intake manifold of the engine so that the flow of the air-fuel mixture is directed onto the heater but is also adopted to flow more freely over and around the heater into the engine. In such cases, where fuel has tended to condense on the walls of a carburetor passage during engine start-up on a cold day or the like, or where the configuration of the heater has differed from the cross-sectional shape of the air-fuel passage of a carburetor or the like, it has been proposed that a tube be arranged to intercept fuel condensed on the air-fuel passage walls and to extend that tube into the manifold to direct such condensed fuel onto the heater at a location inside the manifold. It would be desirable if such a fuel evaporation device could be provided with a sturdy, versatile, low cost construction adopted to achieve such new and advantageous results.

SUMMARY OF THE INVENTION

It is an object of this invention to provide a novel and improved fuel evaporation device; to provide such a device which is adopted to enhance fuel evaporation in an automotive fuel supply system without unduly interfering with the flow of an air-fuel mixture to an automotive engine; to provide such a device which is adopted to accommodate heater units of different selected configurations; to provide such a device which is of sturdy, low cost construction; and to provide such a device which is versatile and readily adopted to fit the requirements of application on different automotive engines.

Briefly described, the novel and improved fuel evaporation device of this invention comprises a self-regulating electrical resistance heater having a multi-passaged body of a ceramic material of positive temperature coefficient resistivity. Preferably the heater has a plurality of square passages extending through the body in side-by-side relation to each other and the number of passages is selected to omit some of the passages at the corner of the heater periphery so that the peripheral configuration of the heater is adopted to substantially fill a generally circular space. Preferably, ohmic contacts to the ceramic resistance material of the heater body are provided on the inner walls of the body passages and two groups of ohmic contacts within the alternate passages are electrically connected together to serve as respective positive and negative electrodes for the heater. That is, the contacts are preferably connected together so that electrical current is adopted to be directed between the electrodes through the thin webs of body material separating the body passages as will be understood.

In accordance with this invention, the fuel evaporation device comprises an electrically insulating gasket means having a central opening therein, the gasket means being adopted to be mounted on the intake manifold of an automotive engine with the central opening aligned with the air-fuel induction passage of a carburetor or throttle body fuel injector or the like. A first electrical terminal preferably has a ring-shaped part mounted on the gasket means so that the ring-shaped part extends around a major part of the periphery of the gasket opening. A second electrical terminal is mounted on the gasket means to extend into the opening in the remaining portion of the periphery of the opening. The gasket means preferably has two plies of rigid gasket material at least one of which is coined to receive the noted terminals therein and the gasket plies are bonded together by adhesive means or the like for capturing the terminals in a common plane between the plies. Preferably, the lower ply of the gasket has a relatively larger central opening than the upper ply and the ring-shaped part of the first terminal and a part of the second terminal extend into the portion of the central gasket opening defined by the lower ply of the gasket. That is, the ring-shaped part of the first terminal and a part of the second terminal are partially exposed from the gasket material around the gasket opening by the larger opening in the lower ply of the gasket material.

In accordance with this invention, a tube has a flange at one end extending around a corresponding major part of the tube periphery and that tube flange is riveted or otherwise secured on the ring-shaped part of the first terminal in electrically connected relation to the first terminal. Hanger means are electrically connected to the opposite end of the tube and to an electrode of the noted heater for mounting the heater within the intake manifold of an engine at a selected spacing from the opposite end of the tube. A conductor connects the other electrode of the heater to the second device terminal for electrically connecting the heater in an energizing circuit.

In that way, the fuel evaporation device is adapted to mount the heater within an intake manifold to enhance fuel evaportion in the desired manner without excessively interfering with the flow of an air-fuel mixture to the engine. The tube is arranged to intercept any fuel which may tend to condense on the walls of the carburetor air-fuel induction passage or the like and to direct that condensed fuel onto the heater to assure full evaporation of that fuel. The device also has a sturdy low-cost construction and is adapted to be used in making application of the heater to meet the requirements of various different types of automotive fuel supply systems or different automotive engines and the like.

DESCRIPTION OF THE DRAWINGS

Other objects, advantages and details of the novel and improved fuel evaporation device of this invention appear in the following detailed description of preferred embodiments of the invention, the detailed description referring to the drawings in which:

FIG. 3 is a section view along line 3—3 of FIG. 1 diagrammatically illustrating mounting of the device in an automotive fuel supply system; and FIG. 4 is partial perspective view of components of the device illustrating the manner of assembly of such components.

DESCRIPTION OF THE PREFERRED EMBODIMENTS

Figure 1:
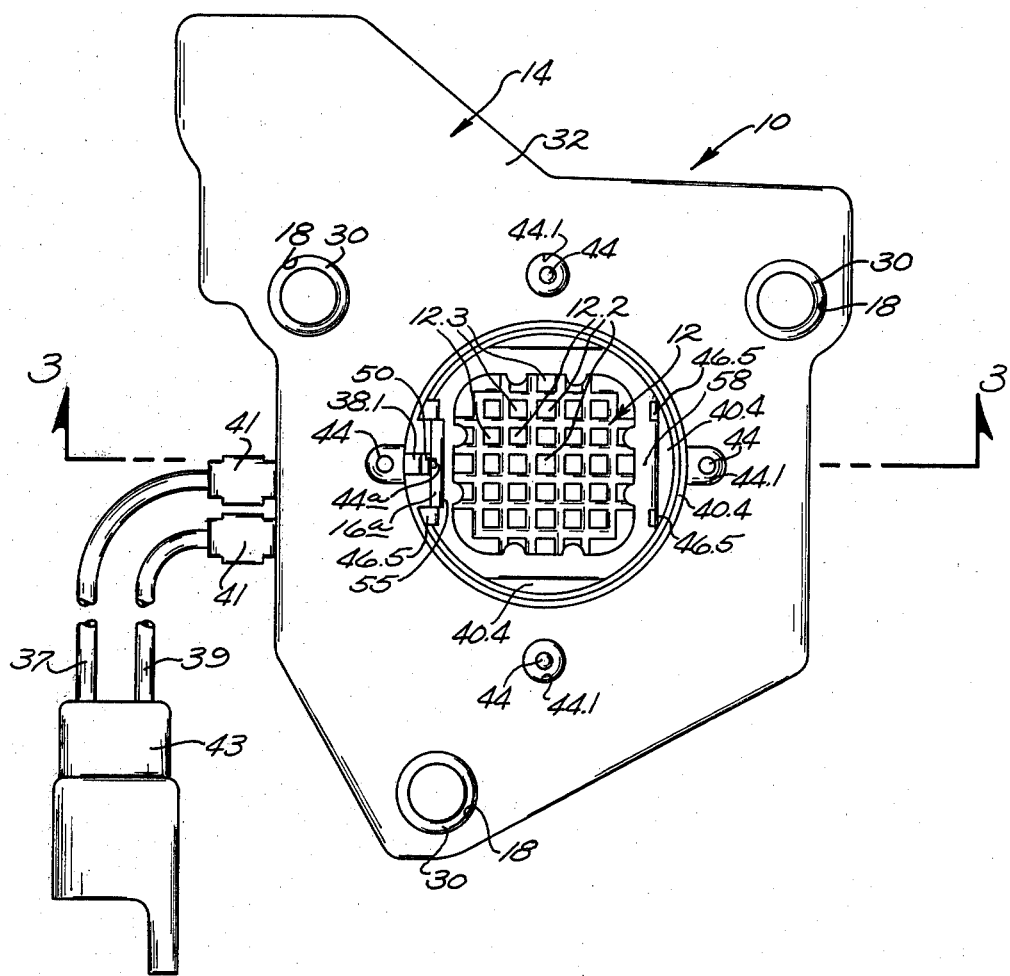
FIG. 1 is a plan view of the device of this invention.
Figure 2:
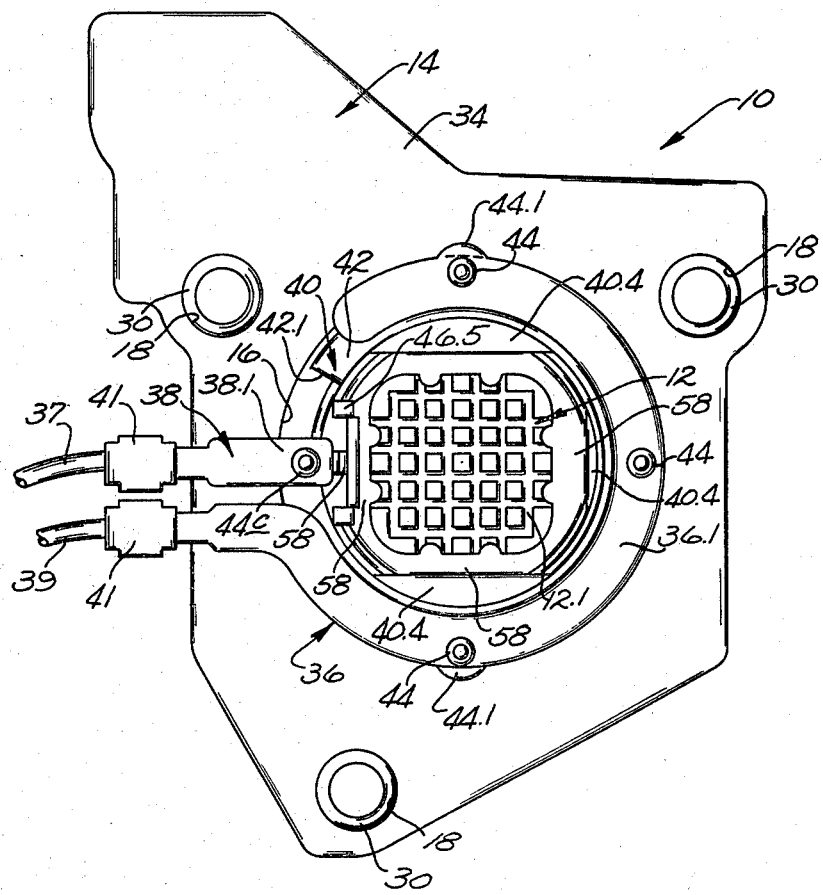
FIG. 2 is a plan view of the device of FIG. 1 showing a ply of the gasket of this invention removed from the device.

Referring to the drawings, 10 in FIGS. 1–3 indicates the novel and improved fuel evaporation device of this invention which is shown to include a self-regulating electrical resistance heater 12 of a generally conventional type. The heater 12 preferably has a body 12.1 formed of a ceramic material or the like which normally displays a relatively low resistivity at room temperature or below but which displays a sharply increasing or positive temperature coefficient of resistivity (PTC) when the heater body material is increased in temperature either by externally applied heat or by self-heating resulting from directing electrical current through the body material. In the preferred embodiment of the invention, the body has a plurality of square passages which are arranged in selected number (as in rows of 3-5-7-7-5-3 passages as shown particularly in FIG. 4) to fill a generally circular shape or the like as may be desired. Preferably, an electrically conductive metallic coating material or the like is provided on the inner walls of the body passages in ohmic contact relation to the body material as is indicated by stippling in FIG. 4 and the ohmic contact coatings in groups of passages 12.2 and 12.3 are electrically interconnected as respective opposite sides of the body to form respective positive and negative electrodes of the heater to which electrical connection can be made at sides 12.4 and 12.5 of the heater as will be understood. See FIG. 4. As similar heater units are described in U.S. Pat. No. 4,107,515, they are not further described herein and it will be understood that where the electrodes 12.4, 12.5 are connected in an electrical circuit, current is adapted to be directed between the ohmic contacts 12.2 and 12.3 in adjacent body passages through thin webs of the resistive material of the body located between the body passages, thereby to self-heat the body to a selected, safe, self-regulated heating temperature which is characteristic of the body material. Of course other self-regulating resistive heaters are also used in the device 10 within the scope of this invention.

In accordance with this invention, the device 10 further includes a gasket means 14 having a central opening 16 and having mounting holes 18 for use in mounting the device 10 on an intake manifold 20 of an automotive engine 22 with a gasket opening 16 aligned with an air-fuel induction passage 24 of a carburetor 26 or other conventional fuel supply system means by the use of screws 28 or the like. Preferably the gasket 14 embodies a plurality of plies of electrically insulating, sealing material such as a phenolic-resin-impregnated cellulose fiber board or the like and the plies are bonded together by the resin or by adhesive means or the like in any conventional manner. The mounting holes 18 are preferably lined with bushing means 30 and indicated in FIGS. 1 and 2.

In accordance with this invention, the gasket 14 preferably comprises a pair of plies 32 and 34 at least one of which is preferably coined or indented in any conventional manner so that the plies are adapted to receive and accomodate a pair of electrical terminals 36 and 38 in a common plane between the plies with the terminals. Typically, leads 37 and 39 insulated as at 41 and spaced by a female 43 are attached to the terminals and the terminals are held by the resin or adhesive and by being captured between the plies in a desired position in the device 10. In accordance with this invention, the first terminal 36 has a ring-shaped part 36.1 which extends around a major but less than complete part of the periphery of the gasket opening 16 and the second terminal 38 has a part 38.1 which extends into the opening 16 in the remaining part of the periphery of the opening 16. The other ends of the terminals extend from the outer periphery of the gasket means to be electrically connected to an automotive power supply or the like for selectively energizing the heater as will be understood. In the preferred embodiment of this invention, the opening 16a in the upper gasket ply 32 is relatively smaller than the opening in the lower gasket ply 34 so that, as is seen in FIG. 3, the ring-shaped part 36.1 of the first terminal is partly captured between the gasket plies 32 and 34 and is partially exposed by the ply 34 around the gasket opening 16 and so that the part 38.1 of the second terminal is also exposed by the gasket ply 34 within the opening 16b.

In accordance with this invention, a tube 40 has a flange 42 which extends around a corresponding major part of the periphery of the tube at one end 40.1 of the tube and has a notch 42.1 in part of the flange. The tube flange is secured by rivets 44 or other conventional means in electrically conductive relation to the ring-shaped part of the first terminal 36 so that the tube is supported in alignment with the gasket opening 16 to extend into the intake manifold 20 of the automotive engine as is shown in FIG. 3 and so that the part 38.1 of the second terminal is accomodated in the tube flange notch 42.1 spaced in electrically insulated relation to the tube 40 as is shown in FIG. 2. Small apertures 44.1 are preferably provided in the upper ply of the gasket to accomodate such rivet means. At the opposite end 40.2 of the tube, the tube preferably has an extending part 40.3 which extends around a selected part of the tube periphery as will be explained below. Preferably the tube 40 has tapered parts as indicated at 40.4 in FIGS. 1–3 which serve to direct the flow of an air-fuel mixture from a fuel supply system passage 24 of any selected cross section size or shape onto a heater 12 which may be of any lesser desired size or shape as will be understood.

In the device 10 of this invention, the heater 12 is disposed in a generally cup-shaped hanger body 46 which has a bottom 46.1 and side walls 46.2 and which has an opening 46.3 in the cup bottom. The heater 12 is disposed within the hanger body so that the heater passages 12.2 and 12.3 are aligned with the opening 46.3. The hanger body is then mounted on the tube 40 in electrically conductive relation to the tube and to one electrode 12.5 of the heater so that the heater 12 is disposed in the path of an air-fuel mixture being furnished to the intake manifold as indicated in FIG. 3 by the arrows 48. The opposite electrode 12.4 of the heater is electrically connected to the second terminal 38 by a conductor 50 as is shown particularly in FIGS. 1-3. Preferably the conductor 50 is arranged to extend to the terminal 34 through the tube 40 and an insulator 51 is riveted as at 44a or otherwise secured to the conductor to electrically insulate the conductor 50 from the tube 40. Alternately, the conductor 50 is enclosed in sleeve of Mylar or other electrical insulating material for electrically insulating the conductor from the tube 40.

Preferably for example, the heater 12 is folded within a fiber board insulator 52 (See FIG. 4) so that most of the heater 12 is electrically insulated from the hanger body 46 but so that an air fuel mixture is adapted to flow through the heater passages 12.2, 12.3 through openings 52.1 and 52.2 in the insulator. Alternately, an insulator like insulator 52 is formed in two separate halves with respective openings 52.1 and 52.2 and dimples are formed in the hanger body to center the heater 12 within the body aligned with the noted openings. A spring terminal 54 is riveted or otherwise secured in the hanger body 46 to make selective electrode connection between the hanger body 46 and the electrode 12.5 of the heater. An additional spring terminal 56 is secured to one end of the conductor 50 by a riveting or the like and is held on the hanger body 46 by an additional insulator 55 to electrically connect the conductor 50 to the heater electrode 12.4 while electrically insulating the conductor from the hanger body. A plurality of projecting hanger arm means 46.4 on the hanger body then secure the hanger to the tube 40 by the use of rivets or the like to suspend the heater 12 at a selected distance or spacing from the tube end 40.2. Preferably tabs 46.5 are provided on the hanger body to be folded over the heater 12 and insulator 52 for holding the heater in the hanger body. Preferably also additional holder means 58 are riveted to the tube 40 at the ends of arms 58.1 and to some of the hanger arms 46.4 as indicated at 58.2 in FIG. 3, thereby to additionally hold the heater and insulator in the hanger body and for holding the hanger body on the tube.

In that arrangement, the device 10 is adapted to be mounted on the intake manifold of an automotive engine or the like for enhancing fuel evaporation without interfering to any undesirable extent with the flow of an air-fuel mixture to the engine. The device disposes its heater 12 at a location within the manifold where the air-fuel mixture can flow over the heater as indicated in FIG. 3 by the arrows 48a or through the heater passages as indicated by the arrows 48b. The space x between the end of the tube 40 and the heater 12 is selected for assuring the desired freedom of flow of the air-fuel mixture over the heater and the heater is located in the path of that flow to assure that the fuel is properly evaporated as it is advanced from the air fuel passage 24 to the engine. The tube 40 is arranged to intercept any fuel which may tend to condense on the walls 24a of the air-fuel passage and to conduct that condensed fuel onto the heater 12 to assure that the fuel is evaporated before being fed into the engine. The tube is adapted to be tapered as required for providing a desired transition in the flow of the air-fuel mixture from an air-fuel passage 24 of a selected cross sectional size and shape to direct that flow onto a heater 12 of a different size or shape if desired. The extending part 40.3 of the tube also aids in directing the flow of the air-fuel mixture in the desired direction within the engine manifold as will be understood. In the sturdy, low cost construction of the device 10, the tube 40 serves to support the heater 12 at the desired location within the manifold and to electrically connect to in a sturdy and reliable manner to the first power input terminal 36 of the device. The other electrode of the heater is also easily connected to the corresponding power terminal 38 in a safe and protected manner. The device terminals are also easily mounted within the gasket means to provide for compact mounting of the device on an automotive engine while also utilizing the terminals in mounting the tube and heater as described. The device is also adapted to be easily assembled and is versatile in that variations in the heater, gasket or tube configuration are easily accomodated within the basic device structure to adapt the device for application with various spacings x as may be desired to meet different engine requirements.

It should be understood that although particular embodiments of the device of this invention have been described by way of illustrating the invention, the invention includes all modifications and equivilants of the disclosed embodiments falling within the scope of the appended claims.

I claim:

1. A fuel evaporation device for use in a fuel supply system having an air-fuel passage for directing an air-fuel mixture into an intake manifold of an engine where fuel condensation may occur on the walls of the passage, said device comprising a self regulating electrical resistance heater to be suspended in the intake manifold to enhance fuel evaporation without interfering excessively with the flow of the air-fuel mixture into the manifold and tube means arranged to intercept fuel condensed on the walls of the air-fuel passage and to extend into the manifold to direct such condensed fuel onto the heater, characterized in that electrically insulating gasket means are adapted to be mounted on the engine for locating the device to receive an air-fuel mixture from the passage, a pair of terminal means are mounted in electrically insulated relation to each other on the gasket means, the tube means are electrically connected at one end to one of the terminal means and at an opposite end to the heater to dispose the heater within the manifold in the path of the air-fuel mixture directed into the manifold, and conductor means connect the heater to the other of said terminal means for electrically connecting the heater in an energizing circuit.

2. A fuel evaporation device for enhancing fuel evaporation without unduly restricting flow of an air-fuel mixture to an automotive engine particularly adapted for use in an automotive fuel supply system having an air-fuel passage directing an air-fuel mixture into an intake manifold of an engine where fuel condensation may occur on walls of the passage, said device comprising a self-regulating electrical resistance heater to be suspended in the intake manifold to enhance fuel evaporation without unduly interferring with the flow of the air-fuel mixture into the manifold and tube means arranged to intercept fuel condensed on the walls of the air-fuel passage and to extend into the manifold to direct such condensed fuel onto the heater characterized in that, electrically insulating gasket means having a central opening therein are adapted to be mounted on the engine with the openings aligned with the air-fuel passage for locating the device to receive an air-fuel mixture from the passage, a first terminal having a generally ring-shaped part mounted on the gasket means to extend around a selected limited part of the periphery of said opening, a second terminal is mounted on the gasket means to extend into the opening in the remaining part of the periphery of the opening, the tube means has a flange at one end extending around a selected limited part of the tube periphery secured in electrically conducting relation to the ring-shaped part of said first terminal, hanger means are electrically connected to an opposite end of the tube means and to the heater to dispose the heater within the manifold in selected space relation to said opposite end of the tube means in the path of the air-fuel mixture directed into the manifold, and conductor means connect the heater to the second terminal for electrically connecting the heater in an energizing circuit.

3. A fuel evaporation device as set forth in claim 2 further characterized in that the gasket means has a plurality of plies, the pair of terminals are mounted between a pair of said plies to extend in a common plane, the ring-shaped part of the first terminal extends around at least a major part of the gasket opening, is held partly between said pair of plies around said opening, and is partly exposed from one of said plies around said major part of the opening, and the tube means flange extends around a corresponding major part of the tube means periphery and is secured to said exposed part of the ring-shaped part of the first terminal to extend into an intake manifold.

4. A fuel evaporation device as set forth in claim 3 further characterized in that said conductor extends from the heater to said second terminal through said tube means and in that electrically insulating means are mounted between the conductor and the tube means for electrically insulating the conductor from the tube means.

5. A fuel evaporation device as set forth in claim 4 further characterized in that the hanger means comprises a separate, cup-shaped metal body having a bottom and side wall and having an opening in the bottom, and the self-regulating electrical resistance heater comprises a multipassaged body of a ceramic material of positive temperature coefficient of resistivity disposed in the hanger body with the heater passages aligned with the hanger body opening so that the heater is adopted to intercept fuel droplets in the air-fuel mixture directed into the manifold and so that the air-fuel mixture is adopted to pass over the heater and through the heater passages to pass into the intake manifold without excessive interferance with the flow of the air-fuel mixture to the engine.

6. A fuel evaporation device as set forth in claim 5 further characterized in that the side walls of the hanger body have tabs folded over the heater for retaining the heater in the hanger body.

7. A fuel evaporation device as set forth in claim 5 further characterized in that the heater has a pair of electrodes, spring means are secured in the hanger body to electrically connect the hanger body to one of the heater electrodes, additional spring means are secured to the conductor to electrically connect the conductor to the other heater electrode, electrical insulator means are disposed between the heater and the hanger body for otherwise electrically insulating the heater from the body, and tabs on the hanger body side walls are folded over the heater and insulator to hold the heater in the hanger body.

8. A fuel evaporation device as set forth in claim 7 further characterized in that a plurality of arms project up from the side walls of the hanger body to connect the hanger body to said opposite end of the tube means in selected spaced relation to the opposite end of the tube means.

* * * * *